March 12, 1963     E. H. MIDDENDORF     3,080,857
ENGINE COOLANT SYSTEM
Filed Dec. 14, 1960     2 Sheets-Sheet 1
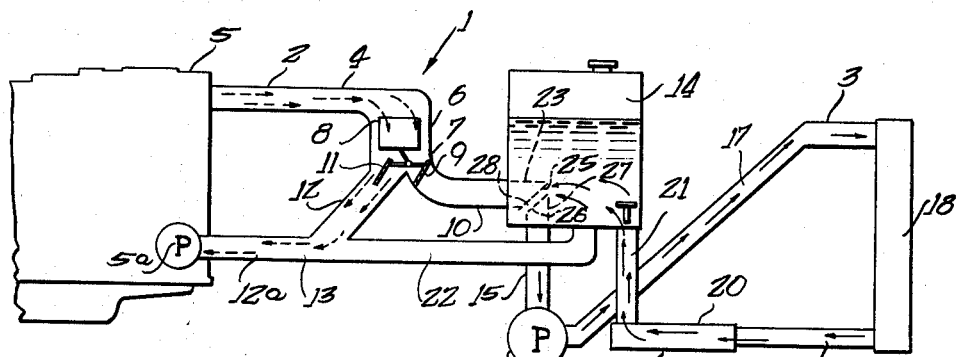
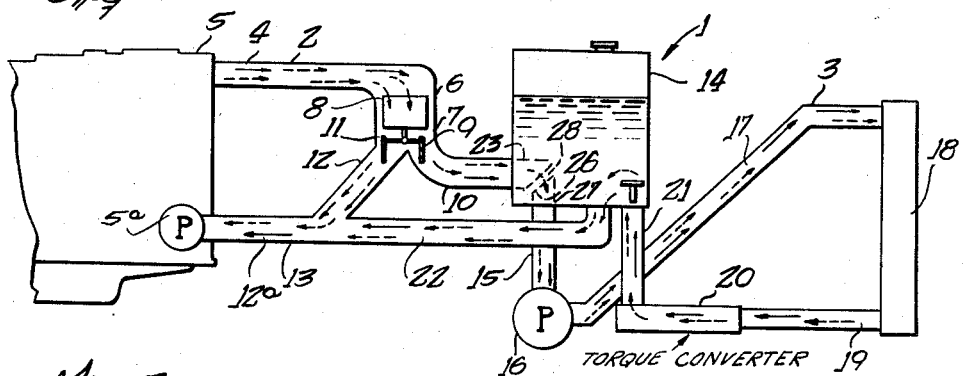
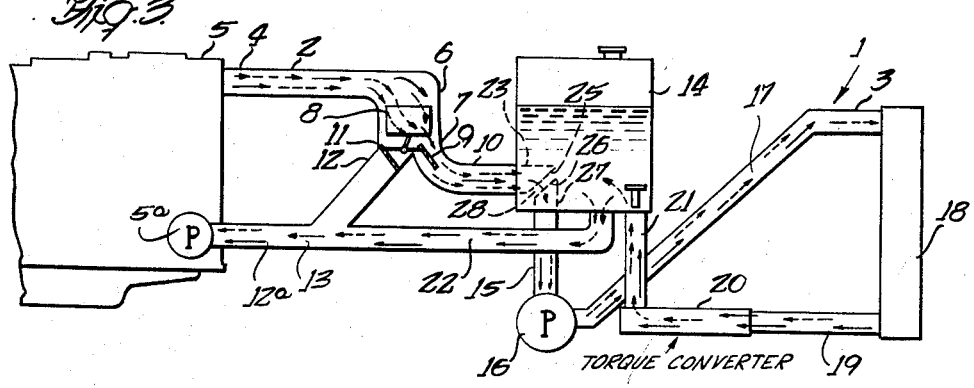
INVENTOR
Eugene H. Middendorf
ATTORNEY

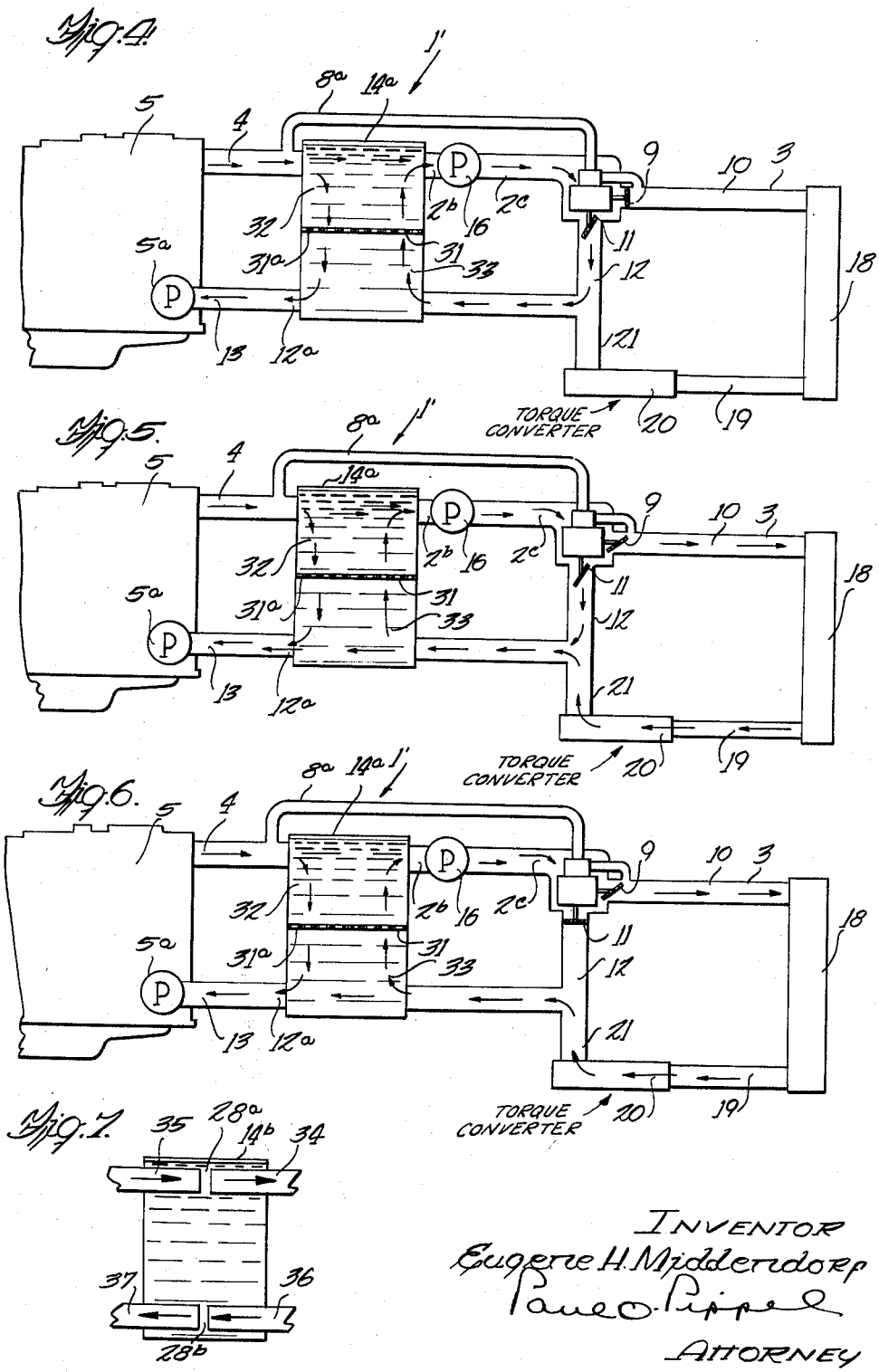

United States Patent Office 3,080,857
Patented Mar. 12, 1963

3,080,857
ENGINE COOLANT SYSTEM
Eugene H. Middendorf, Glen Ellyn, Ill., assignor to International Harvester Company, Chicago, Ill., a corporation of New Jersey
Filed Dec. 14, 1960, Ser. No. 75,867
19 Claims. (Cl. 123—41.1)

This invention relates to means for cooling an engine and in particular relates to a coolant system having an engine coolant circuit communicable with a coolant cooling circuit in accordance with the thermal behavior of the engine.

It is a well known practice than in internal combustion engine has about it a coolant jacket which usually contains water as the coolant for preventing the engine from becoming unduly heated due to process of combustion taking place therein. The coolant is circulated through the water jacket by a pump which also circulates the water through a cooling medium or heat exchanger whence the subsequently cool coolant is circulated back through the engine. The pumping of the water through the heat exchanger not only places an additional burden on the engine water pump and the rate of coolant flow to the engine but also effects control of the temperature of the coolant within the engine water jacket. In order to control the circulation of the fluid through the engine when such coolant is required to be cooled, the invention provides an auxiliary coolant cooling circuit having its own pump effective to introduce the cool coolant into the engine water jacket as required.

It is therefore an object of this invention to provide a new and novel engine cooling system.

It is another object of this invention to provide an engine coolant system having an engine coolant circuit and a cooling coolant circuit, each of said circuits having their own coolant pumps.

It is another object of this invention to provide a dual engine coolant system having an engine coolant pump and an auxiliary pump for coolant delivery to a heat exchanging medium.

It is still another object of this invention to provide an engine coolant system having an engine coolant pump for circulating the coolant around the engine and thermally controlled bypass means for sending the coolant to a heat exchanger with the aid of auxiliary pump in a heat exchange circuit and wherein there is provided flow control means enabling effective operation of both of the pumps when the coolant in the engine is introduced into the heat exchanger circuit.

It is still another object of this invention to provide an engine coolant system having an engine coolant pump for circulating the coolant around the engine and thermally controlled bypass means for sending the coolant to an auxiliary pump in a heat exchange circuit and wherein there is provided between the engine coolant circuit and the heat exchanger circuit flow control means enabling effective operation of both of the pumps when the coolant in the engine is introduced into the heat exchanger circuit.

It is a further object of this invention to provide an engine coolant system having an engine circuit and alternatively being in communication with another coolant circuit having a heat exchanger therein and having thermal control means and mixing control means interposed in the system.

It is another object of this invention to provide a method of controlling and conditioning the engine coolant by circulation of the engine coolant from an engine circuit to a heat exchange circuit in accordance with the heating characteristics of the engine.

These and other objects of the invention will become apparent from reference to the attached drawings and the following description, it being understood that the subsequent explanation of the embodiment disclosed herein expresses one form which the invention may take but is not to be construed as a limitation on the scope or breadth of the claims appended hereto, wherein:

FIGURE 1 is a diagrammatic view of the invention illustrating the dual engine coolant system which shows the engine circuit divorced from the heat exchanger circuit;

FIGURE 2 is a view similar to FIGURE 1 but wherein the engine circuit is partially in fluid communication wth the heat exchanger circuit;

FIGURE 3 is a view similar to FIGURES 1 and 2 but wherein there is maximum fluid communication between the engine circuit and the heat exchanger circuit;

FIGURES 4 through 6 illustrate a modified form of the dual engine coolant system; and FIGURE 7 illustrates a further modified type of mixing tank.

Referring now to FIGURES 1 to 3 there is shown an engine coolant system 1 comprising an engine coolant circuit 2 and a heat exchanger circuit 3. The engine circuit has a fluid conduit 4 leading from an engine 5, and engine coolant jacket having an engine pump 5a, the conduit 4 being joined at its other end 6 to an inverted Y-shaped housing 7 having therein a conventional thermostat unit 8 as shown in U.S. Patent No. 3,014,467 to E. Middendorf et al. and including a heat exchanger bypass valve 9 in conduit 10 leading from the housing 7 and an engine return bypass valve 11 in conduit 12 leading from housing 7. The temperature affected control unit or thermostat 8 is so located as to not effect pressure drop in the engine cooling system, i.e. it is mounted on the housing 7 in non-flow obstructing relation to the engine circuit 2. The thermostat 8 is so constructed that when the engine coolant 13 reaches a certain temperature, say 140° Fahrenheit, it starts to open heat exchanger butterfly valve 9 and starts to close engine butterfly valve 11 for reducing the flow of fluid through conduit 12 back to the engine 5. At a certain higher temperature and in this case it is 160° Fahrenheit, the heat exchanger valve 9 is completely open permitting all of the engine coolant 13 to flow therethrough and prevent any flow of fluid through valve 11 back to the engine 5 by way of conduits 12 and 12a and engine pump 5a. Conduit 10 enters into the makeup and mixing tank 14. A conduit 15 within the tank 14 adjacent and at right angles to conduit 10 exits from the mixing tank 14 and enters into the heat exchanger pump or auxiliary pump 16 and a conduit 17 exits from the auxiliary pump 16 to the engine radiator 18 and conduit 19 exits from the radiator 18 into the engine torque converter cooler 20 and conduit 21 joins the cooler 20 with the mixing tank 14 and conduit 22 communicates between the mixing tank 14 and engine return conduit 12a communicating with conduit 12. The mixing tank 14 has a splash retarder adjacent the entrance of conduit 21 to prevent foaming of the coolant 13 as it enters mixing tank 14 from conduit 21.

The portion 23 of the conduit 10 within the mixing tank 14 has its end 25 removed a short distance away from the end 26 of the portion 27 of conduit 15 providing a gap 28 therebetween. The size of the gap 28 compensates for any difference between the flow outputs of the engine pump 5a and the auxiliary pump 16 for if the auxiliary pump 16 had the greater output it would tend to cavitate the engine pump 5a were it not for the gap 28 between the pump 5a of engine circuit 2 and pump 16 of heat exchanger circuit 3, the gap 28 allowing coolant 13 in conduit 10 to mingle in the tank 14 and to be obstructed by the coolant 13 in tank 14 in accordance with the flow capacities developed by the pumps 5a and 16.

FIGURE 1 illustrates the condition that exists when the butterfly valve 9 is completely closed and the butterfly valve 11 is fully open as is the condition when the engine coolant circuit does not have to have its coolant 13 cooled by the heat exchanger 18 and for this embodiment exists at coolant temperatures in the engine circuit 2 that are below 140° Fahrenheit. Under these circumstances all the coolant 13 in the engine circuit 2 is continuously sent through the engine 5, none of it being introduced into the heat exchange circuit 3. The heat exchanger circuit 3 is also divorced from the engine circuit 2 and is kept in circulation by pump 16 by way of the gap 28 in the mixing tank 14. The flow condition in the connecting conduit 22 between the tank 14 and the inlet conduit 12a is inert since each circuit 2 and 3 have their flow condition satisfied in accordance with the requirement of their respective pumps 5a and 16. This flow pattern where coolant 13 in each circuit 2 and 3 is divorced from one another is represented in FIGURE 1 by dash arrow lines in the engine circuit 2 and solid arrow lines 3 in the heat exchanger circuit 3.

When the coolant 13 within the engine circuit 2 exceeds 140° Fahrenheit, the thermostat 8 will start to open the heat exchanger bypass valve 9, FIGURE 2 illustrating the conidtion that exists when the bypass valves 9 and 11 are both partially open. The equlibrium flow condition established in the circuits 2 and 3 when the engine coolant temperature was less than 140° Fahrenheit is now disturbed such that some of the engine coolant 13 now passes through heat exchanger bypass valve 9 in conduit 10 and bridges the gap 28 substantially in accordance with the flow capacities of the output engine pumps 5a and 16 and flows into conduit 15 and at which time it is being drawn from conduit 10 to conduit 15 by the suction of the auxiliary heat exchanger pump 16. At the same time coolant 13 in the heat exchanger circuit 3 is being circulated therethrough by the auxiliary pump 16. The coolant 13 passes from the mixing tank 14 through the gap 28 and into the conduit 15 and mixes with coolant 13 from the engine circuit 2 if the pump 16 demands more coolant than pump 5a can deliver. This mixed coolant 13 is passed through pump 16 and heat exchanger 18 and torque converter coolant 20 into the mixing tank 14 joining with the body of coolant in tank 14 to flow out to conduit 22 to conduit 12a and the engine pump 5a into the engine 5 and out conduit 4 and back to the heat exchanger bypass valve 9. At the same time the rest of the coolant 13 coming from the engine 5 to conduit 4 passes through the engine bypass valve 11 through conduit 12 and joins the mixed coolant 13 from the line 22. If the pump 16 cannot handle all the coolant flow from circuit 2 then the extra coolant from circuit 2 can flow through gap 28 into mixing tank 14 and through conduit 22 to engine 5. This entire circulating flow pattern is directed and controlled by the concertive effort of the engine pump 5a and the heat exchanger pump 16. This intermingling of the coolant 13 from the engine circuit 2 with the coolant 13 from the heat exchanger circuit 3 is diagrammatically illustrated in FIGURE 2 by the light dash arrow lines representing the coolant from the engine circuit 2 and the heavy arrow lines indicating the coolant 13 from the heat exchanger circuit 2.

When the temperature in the engine circuit 2 exceeds 160° Fahrenheit as shown in FIGURE 3 all coolant flow through engine bypass valve 11 is terminated and the entire amount of coolant 13 in the engine circuit 2 passes through heat exchanger bypass valve 9 into conduit 15 through the pump 16 and the heat exchanger or radiator 18 and torque converter cooler 20 and back into the mixing tank along with the coolant 13 in the heat exchanger circuit 3 that passes through the pump 16 and heat exchanger 18, torque converter 20, and tank 14. The mixed coolant 13 then passes out of the tank 14 through conduit 22, conduit 12a and engine pump 5a acting in conjunction with pump 16 into the engine 5 and back out through conduit 2 in a continuous flow pattern. This is diagrammatically illustrated in FIGURE 3 by dash arrow lines and solid arrow lines showing all coolant 13 is circulated through the coolant system 1 and that all of the coolant 13 from the engine 5 passes through heat exchanger 18. If the pump capacity of pump 16 exceeds the pump capacity of pump 5a, some coolant 13 from tank 14 enters gap 28 and passes through conduit 15 and eventually to the engine 5 whereas if the pump capacity of pump 16 is less than the pump capacity of pump 5a, some coolant 13 from conduit 10 flows through gap 28 into tank 14 and eventually to the engine 5. The direction of coolant flow in gap 28 depends on the relative flow capacities of pumps 5a and 16.

It is therefore seen that the engine coolant circuit is interconnected with a heat exchanger coolant circuit which may also cool other components subject to being heated such as an associated engine torque converter. Under this arrangement it will be appreciated that a series of components requiring cooling may be interconnected by thermostatic bypass arrangement to the heat exchanger circuit. This permits the circuit in which the component or engine to be cooled is allowed to have its own coolant pump of a given capacity and to maintain desirable flow characteristics within its circuit and yet to be gradually introduced to a heat exchanger circuit in accordance with thermal cooling requirements, such a combination of circuits lending to a more uniform rate of coolant temperature control over the engine or like component. This dual circuitry also protects the pump within each of the circuits involved and permits the use of pumps having different flow capacities in one circuit while employing a pump having different flow capacities in another circuit, the introduction of the gap between the circuits preventing one pump from cavitating or fighting with another. Referring now to FIGURES 4-6 there is shown a modified engine coolant system 1' and the references applied thereto are the same as applied to FIGURES 1 through 3, except in instances where structural and functional variances occur. The system 1' operates in a manner similar to the system 1 having an engine coolant circuit 2 and a heat exchanger circuit 3 except that the thermal responsive means or thermostat unit 8 has been relocated between the mixing tank 14a and the heat exchanger 18 in the heat exchanger circuit 3, said thermostat 8 also being constructed similar to that shown in U.S. Patent No. 3,014,467 to E. Middendorf et al. Also heat exchanger circuit pump 16 having inlet 2b and outlet 2c is located between the thermal unit 8 and the tank 14a and the line 12 empties into line 21 entering the mixing tank 14a which connects to engine 2 by engine inlet line 12. The mixing tank also has a perforated baffle plate 31 only dividing the tank 14 into areas 32 and 33 for passage of coolant to and from pump 16 respectively and providing mixing of coolant in each area 32, 33 when the flow capacity of either pump 5a or 16 exceeds the other as previously explained. Under this latter construction coolant flow is from the engine 5 through mixing tank 14a and through bypass valve 11 to tank 14a and back to engine 5 where temperature is below 140° F. (see FIGURE 4) as previously discussed or through bypass valves 9 and 11 for divided flow through heat exchanger 18 to mixing tank 14a as well as directly to the mixing tank 14a where the temperature is between 140° F. and 160° F. (see FIGURE 5) as previously discussed or all through bypass valve 9 only to exchanger 18 and the mixing tank 14 and engine 5 where the temperature exceeds 160° F. (see FIGURE 6) as previously explained. Under such construction flow is always through the mixing tank 14 at any temperature and this tends to keep the temperature of the engine more constant in a desired temperature operating range since the larger mass of water in the mixing tank must be heated sufficiently before it is necessary to rely on the cooling effect of the heat exchanger 18. Also the engine is not exposed to as such rapid a temperature drop as would be if the tank 14 was constantly exposed to the cooling effect of the heat exchanger or radiator 18.

FIGURE 7 shows a modified tank 14b having pipes 34 and 35 spaced apart a gap 28a for connecting with line 2b and 2 of system 1' and pipes 36 and 37 spaced apart a gap 28b for connecting with line 21 and 12a of system 1' shown in FIGURES 4 through 6. This modified tank 14b may be used in the first system 1 and the construction of pipes 34, 35, 36, 37 may be used in combination with the baffle plate 31. The use of the type of piping in tank 14b provides more direct flow with less mixing as the baffle type of tank 14a.

It is to be appreciated that the thermostat unit 8 may be replaced by other control means such as a manually controlled valve arrangement operable in accordance with the dictates of the operator.

What is claimed is:

1. An engine coolant system for a fluid coolant comprising an engine coolant circuit and a heat exchanger coolant circuit interconnected therewith conducting the coolant therebetween, the engine circuit including an engine coolant jacket having an inlet and an outlet side and an engine coolant circulating pump on the inlet side for directing the coolant through the jacket and a thermostat on the outlet side providing interrupted fluid flow to the engine and to the heat exchanger circuit in accordance with the engine temperature characteristics, the heat exchanger circuit including a heat exchanger having inlet and outlet sides and a heat exchanger coolant circulating pump on the inlet side, and means interconnecting the two circuits and including a mixing tank having first conduit means within the tank in fluid communication with the thermostat and second conduit means in communication with the outlet side of the heat exchanger and a third conduit means within the tank in fluid communication with the inlet side of heat exchanger pump and spaced apart from the first conduit means and defining with the first conduit a zone of coolant escape within the mixing tank.

2. An engine coolant system for a fluid coolant comprising an engine coolant circuit and a heat exchanger coolant circuit interconnected therewith conducting fluid therebetween, the engine circuit including an engine coolant jacket and an engine coolant pump in fluid communication with the jacket and a temperature sensitive unit in fluid communication with the jacket directing the coolant thereto and to the heat exchanger circuit in accordance with the engine temperature characteristic, the heat exchanger circuit including a coolant heat exchanger and a heat exchanger pump in fluid communication therewith, and means interconnecting the two circuits and including a mixing tank, first conduit means between the temperature sensitive unit and the mixing tank and having extension within the tank in fluid communication with the temperature sensitive unit, and second conduit means between the heat exchanger pump and the mixing tank and having extension within the tank in fluid communication with the heat exchanger pump, said extensions of each conduit within the tank being spaced apart from one another and defining a zone of coolant escape within the mixing tank.

3. An engine coolant system for a fluid coolant comprising an engine coolant circuit and a heat exchanger coolant circuit interconnected therewith providing coolant cooling, the engine circuit having an engine jacket and a pump in communication with the jacket and a temperature sensitive unit in communication with the jacket directing coolant thereto and to the heat exchanger circuit in accordance with the engine temperature characteristics, the heat exchanger circuit including a coolant heat exchanger and a pump in communication with the exchanger, and means between the temperature sensitive unit and the heat exchanger and interconnecting the two circuits and having an obstruction to fluid flow between the two circuits preventing one pump from cavitating the other pump as the temperature sensitive unit permits coolant exchange between the circuits.

4. A power unit coolant system providing a plurality of circuits for a coolant and having an interrupted flow connection between each of the circuits, one of the circuits including an engine coolant jacket and an associated pump in the circuit for circulation of the coolant therethrough, a second circuit including a coolant heat exchanger and a pump in the second circuit in coolant communication with the exchanger for coolant circulation therethrough, and the connection providing thermal responsive means having a first selective position communicating coolant to the engine jacket only and a second selective position communicating coolant to the second circuit and to said one of the circuits in response to coolant temperature changes in engine jacket and having an enlarged area of coolant exchange between the thermal responsive means and the second circuit communicating coolant from the engine jacket to the heat exchanger in the second position of the thermal responsive means, said area of coolant exchange providing a flow rate equalizing means between the engine pump and the heat exchange pump.

5. A power unit coolant system providing a plurality of circuits for a coolant and having an interrupted flow connection between each of the circuits, one circuit including an engine coolant jacket and an associated pump in the one circuit for circulation of the coolant therethrough, a second circuit including a coolant heat exchanger and a pump in the second circuit in coolant communication with the exchanger for coolant circulation therethrough, and the connection providing thermal responsive means having a first selective position communicating coolant to the engine jacket only and a second selective position communicating to the second circuit and the engine jacket circuit in response to coolant temperature changes in engine jacket and having an enlarged area of coolant exchange between the thermal responsive means and the second circuit, communicating coolant from the engine jacket to the heat exchanger, said area of exchange providing a flow rate equalizing means between the engine pump and the heat exchange pump, the means forming a space between the one circuit and the second circuit and having a container between the one circuit and the second circuit and having a container between the one and second circuits enclosing said space and providing a mixing zone for coolant from the one and second circuits.

6. A power unit coolant system providing a plurality of circuits for a coolant and having an interrupted flow connection between each of the circuits, one of the circuits including an engine coolant jacket and an associated pump in the circuit for circulation of the coolant therethrough, a second circuit including a coolant heat exchanger and a pump in the second circuit in coolant communication with the exchanger for coolant circulation therethrough, said one and second circuits having extensions with ends approximate one another and defining gap therebetween, and a container having coolant therein and surrounding the extensions and the gap and providing an area of coolant exchange between the circuits equalizing the flow rate between each pump, a temperature sensitive control unit operatively connected with said engine jacket and the extension of said one circuit between the engine jacket and the container and directing coolant from the first circuit into the gap in certain position of the temperature sensitive control unit.

7. A power unit coolant system providing a plurality of circuits for a coolant and having an interrupted flow connection between each of the circuits including an engine coolant jacket and an associated pump in one circuit for circulation of the coolant therethrough, a second circuit including a coolant heat exchanger and a pump in the second circuit in coolant communication with the exchanger for coolant circulation therethrough, a temperature sensitive control unit in the system and having a pair of valves, one of said valves opening as the other of said valves is closing, the valves permitting selective fluid communication between the engine jacket and the second circuit, said one and second circuits having extensions with ends approximate one another and defining a gap therebetween and a container surrounding the extensions and the gap and receiving coolant from the gap in equalizing the flow rate between each pump, and conduit means between the tank and the one circuit for replenishing the latter with coolant spilling through said gap.

8. A coolant system for a coolant and comprising a pair of interconnected flow circuits, the first circuit including an engine coolant jacket having inlet and outlet conduits and a pump for circulating the coolant therethrough and a first passageway connected between the inlet and outlet conduits, the second circuit comprising a heat exchanger having inlet and outlet conduits and a pump for circulating the coolant therethrough, a coolant mixing area having connection with the inlet and outlet conduits of the second circuit, a second passageway connecting the outlet conduit of the first circuit with the mixing area, and a third passageway connecting the mixing area with the inlet conduit of the first circuit, temperature sensitive means in the first circuit sensing temperature changes therein and having a first valve in the first passageway and a second valve in the second passageway, said temperature sensitive means operative to move one valve to a closing position as the other valve moves to an open position, said mixing area defining a zone of coolant escape from the first circuit into the area conditioning the pumping action of one circuit with respect to the other circuit.

9. A coolant system for a coolant and comprising a pair of interconnected flow circuits, the first circuit including an engine coolant jacket having inlet and outlet conduits and a pump for circulating the coolant therethrough and a first passageway connected between the inlet and outlet conduits, the second circuit comprising a heat exchanger having inlet and outlet conduits and a pump for circulating the coolant therethrough, a coolant mixing area having connection with the inlet and outlet conduits of the second circuit, a second passageway connecting the outlet conduit of the first circuit with the mixing area, a third passage connecting the mixing area with the inlet conduit of the first circuit and temperature sensitive means in the first circuit sensing temperature changes therein and having a first valve in the first passageway and a second valve in the second passageway, said temperature sensitive means operative to move one valve to a closing position as the other valve moves to an open position, said mixing area defining a zone of coolant escape from the first circuit into the area conditioning the pumping action of one circuit with respect to the other circuit, said mixing area including a mixing tank, and said first passageway having extension into the tank, and said inlet conduit of the second circuit having extension into the tank approximate the passageway extension and providing a space therebetween.

10. A coolant system for a coolant and for an engine and an engine torque converter and comprising a pair of interconnected flow circuits, the first circuit including an engine coolant jacket having inlet and outlet conduits and a pump for circulating the coolant therethrough and a first passageway connected between the inlet and outlet passages, the second circuit comprising a heat exchanger having inlet and outlet conduits and a pump for circulating the coolant therethrough, a coolant mixing area having connection with the inlet and outlet conduits of the second circuit, and a second passageway connecting the outlet conduit of the first circuit with the mixing area, and a third passage connecting the mixing area with the inlet conduit of the first circuit and temperature sensitive means in the first circuit sensing temperature changes therein and having a first valve in the first passageway and a second valve in the second passageway, said temperature sensitive means operative to move one valve to a closing position as the other valve moves to an open position, said mixing area defining a zone of coolant escape from the first circuit into the area conditioning the pumping action of one circuit with respect to the other circuit, said other circuit having a torque converter coolant jacket having inlet and outlet conduits in connection with the heat exchanger.

11. A liquid coolant system for a coolant and comprising a plurality of interconnected coolant flow circuits, one circuit including an engine coolant jacket and a pump communicating with the jacket, a second circuit including a heat exchanger and a pump communicating with the heat exchanger, a liquid coolant mixing area having connection between the circuits, and temperature sensitive means in one of the circuits and operatively connected to the mixing area and operative to selectively permit communication between the engine jacket and the heat exchanger, the mixing area defining a restricted passage of coolant escape from one of the circuits to the other in adjusting flow capacity of the pumps of both circuits, said temperature sensing means including bypass valve means in operative connection with the engine and the mixing area and preventing liquid coolant communication between the engine jacket and the heat exchanger in one position thereof and permitting mixing of the liquid coolant from the heat exchanger and the engine jacket within the mixing area in another position of the bypass valve means.

12. An engine coolant system for a fluid coolant and comprising an engine coolant circuit and a heat exchanger coolant circuit interconnected therewith providing coolant cooling, the engine circuit having an engine jacket and a pump in communication with the jacket, a temperature sensitive bypass valve unit in communication with the jacket directing coolant thereto and having conduit means directing coolant to the heat exchanger circuit in accordance with the engine temperature characteristics, the heat exchanger circuit including a coolant heat exchanger and a pump in communication with the exchanger, and means being connected between the conduit means and the second circuit and including a passage having connection with the bypass valve unit and providing an obstruction to flow between the two circuits preventing one pump from cavitating the other pump as the bypass valve unit permits coolant exchange between the circuits.

13. An engine coolant system for a fluid coolant, an engine coolant circuit and a heat exchanger coolant circuit interconnected therewith providing coolant cooling, the engine circuit having an engine jacket and a pump in communication with the jacket, a bypass valve connected with the jacket and providing conduit means for directing the coolant to the heat exchanger circuit, the heat exchanger circuit including a coolant heat exchanger and a pump in communication with the exchanger, and means being connected between the conduit means and said bypass valve and providing an obstruction to fluid flow between the two circuits preventing one pump from cavitating the other pump as the bypass valve permits coolant exchange between the circuits.

14. A power unit coolant system providing a plurality of circuits for a coolant and having an interrupted flow connection between each of the circuits, one of the circuits including an engine coolant jacket and an associated pump in the circuit for circulation of the coolant therethrough, a second circuit including a coolant heat exchanger and a pump in the second circuit in coolant communication with the exchanger for coolant circulation therethrough, the connection including thermal responsive means operatively connected with said one of the circuits and having a first selective position communicating coolant to the engine jacket and a second selective position communicating toward the second circuit and said one of the circuits in response to coolant temperature changes in engine jacket, said connection having an enlarged area of coolant exchange operatively connected with the thermal responsive means and communicating coolant from the engine jacket to the heat exchanger, said area of exchange providing a flow rate equalizing means between the engine pump and the heat exchange pump and having a pair of extensions in said enlarged area and each of the extensions defining an orifice providing fluid communication between the enlarged area and each of the circuits.

15. A power unit coolant system providing a plurality of circuits for a coolant and having an interrupted flow connection between each of the circuits including an engine coolant jacket and an associated pump in one circuit for circulating the coolant therethrough, a second circuit including a coolant heat exchanger and a pump in the second circuit in coolant communication with the exchanger for coolant circulation therethrough, said interrupted flow connection including a flow dividing control unit having a pair of valves, one of said valves being operatively connected with the engine jacket and opening as the other of said valves is closing, said interrupted flow connection having a first extension connecting said other of the valves and a second extension connecting the second circuit, the valves permitting selective fluid communication between the engine jacket and the second circuit, the extensions having ends approximate one another and defining gap means therebetween and a container surrounding the extensions and the gap means and receiving coolant from the gap means in equalizing flow rate between each pump.

16. An engine coolant system for a fluid coolant and comprising an engine coolant circuit and a heat exchanger coolant circuit interconnected therewith providing coolant cooling, the engine circuit having an engine jacket and a pump in communication with the jacket, a bypass valve control unit in communication with the engine coolant circuit, the heat exchanger circuit including a coolant heat exchanger and a pump communicating with the exchanger, a mixing tank between each of the pumps and having connection with the control unit and the heat exchanger circuit for providing fluid communication between the two circuits, said mixing tank providing a restricted flow passage between the two circuits and preventing one pump from cavitating the other pump as the flow dividing control unit permits coolant exchange between the circuits.

17. An engine coolant system for a fluid coolant and comprising an engine coolant circuit and a heat exchanger coolant circuit interconnected therewith providing coolant cooling, the engine circuit having an engine jacket and a pump in communication with the jacket, a flow dividing control unit in communication with each of the circuits and providing coolant exchange circuit therebetween, the heat exchanger including a coolant heat exchanger and a pump in communication with the exchanger, a mixing tank between each of the pumps and having connection with each circuit for providing fluid communication therebetween, said mixing tank providing an obstruction to flow between the two circuits and preventing one pump from cavitating the other pump as the flow dividing control unit permits exchange between the circuits, said mixing tank having baffle plate means including a plurality of orifices therein for providing mixing of the coolant from each circuit within said mixing tank.

18. An engine coolant system for a fluid coolant and comprising an engine coolant circuit and a heat exchanger coolant circuit interconnected therewith providing coolant cooling, the engine circuit having an engine jacket and a pump in communication with the jacket, a flow dividing control unit in communication with each of the circuits and providing coolant exchange therebetween, the heat exchanger circuit including a coolant heat exchanger and a pump in communication with the exchanger, a mixing tank between each of the pumps and having connection with each circuit for providing fluid communication therebetween, said mixing tank providing an obstruction to flow between the two circuits and preventing one pump from cavitating the other pump as the flow dividing control unit permits exchange between the circuits, said mixing tank having a pair of extensions therein having connection with each circuit and providing two-way directional flow between said circuits, each extension having an opening providing communication of the coolant in the extension with the mixing tank.

19. An engine coolant system for a fluid and comprising a first fluid receiving circuit and a second fluid receiving circuit interconnected therewith, the first circuit having a fluid pump, a bypass valve unit in connection with the first circuit, the second circuit including a fluid pump, a mixing tank between each of the pumps and having connection with the bypass valve unit and the second circuit for providing communication between the two circuits, said mixing tank being provided with a restricted flow passage between the two circuits and preventing one pump from cavitating the other pump as the flow dividing control unit permits fluid exchange between the circuits.

References Cited in the file of this patent
UNITED STATES PATENTS
2,321,882    Wallace _____ June 15, 1943